(12) United States Patent
Sawka

(10) Patent No.: US 7,958,823 B2
(45) Date of Patent: Jun. 14, 2011

(54) CONTROLLABLE DIGITAL SOLID STATE CLUSTER THRUSTERS FOR ROCKET PROPULSION AND GAS GENERATION

(76) Inventor: Wayne N. Sawka, Reno, NV (US)

( * ) Notice: Subject to any disclaimer, the term of this patent is extended or adjusted under 35 U.S.C. 154(b) by 724 days.

(21) Appl. No.: 11/305,742

(22) Filed: Dec. 16, 2005

(65) Prior Publication Data
US 2008/0134924 A1 Jun. 12, 2008

Related U.S. Application Data

(60) Provisional application No. 60/637,018, filed on Dec. 17, 2004.

(51) Int. Cl.
*F02K 9/08* (2006.01)
*C06B 45/00* (2006.01)

(52) U.S. Cl. ........ 102/291; 102/202.5; 102/202; 60/256

(58) Field of Classification Search ............ 102/291, 102/287, 288, 202, 202.5, 202.11; 60/250, 60/253, 256
See application file for complete search history.

(56) References Cited

U.S. PATENT DOCUMENTS

| | | | |
|---|---|---|---|
| 3,010,400 A * | 11/1961 | Guay | 102/287 |
| 3,636,709 A * | 1/1972 | La Rocca | 60/203.1 |
| 5,451,277 A | 9/1995 | Katzakian, Jr. et al. | |
| H001598 H * | 10/1996 | O'Reilly et al. | 102/202.8 |
| 5,734,124 A | 3/1998 | Bruenner et al. | |
| 5,837,931 A | 11/1998 | Bruenner et al. | |
| 5,847,315 A | 12/1998 | Katzakian, Jr. et al. | |
| 6,131,385 A | 10/2000 | Lewis, Jr. et al. | |
| 6,237,494 B1 * | 5/2001 | Brunet et al. | 102/202.7 |
| 6,332,403 B1 * | 12/2001 | Weise et al. | 102/472 |
| 6,378,292 B1 | 4/2002 | Youngner | |
| 6,769,241 B2 * | 8/2004 | Spanjers et al. | 60/203.1 |
| 6,817,298 B1 | 11/2004 | Zharkov et al. | |
| 7,281,367 B2 | 10/2007 | Rohrbaugh et al. | |
| 2005/0115439 A1 * | 6/2005 | Abel et al. | 102/288 |
| 2006/0053970 A1 | 3/2006 | Dreizin et al. | |
| 2006/0185898 A1 | 8/2006 | Seekford | |
| 2007/0095445 A1 | 5/2007 | Gangopadhyay et al. | |
| 2008/0087003 A1 * | 4/2008 | Dulligan et al. | 60/254 |

OTHER PUBLICATIONS

Bestgen, R.F. (Jul. 1971). "A Study of the Effects of Electric Fields on Solid Propellant Burning Rates," Air Force Technical Report: AFRPL-71-87, 176 pages.

Lewis, D. H. et al. (2000). "Digital Micropropulsion," *Sensors and Actuators* 80:143-154.

International Preliminary Report on Patentability mailed on Nov. 25, 2010, for PCT Application No. PCT/US2009/044206, filed on May 15, 2009, eight pages.

(Continued)

*Primary Examiner* — James S Bergin
(74) *Attorney, Agent, or Firm* — Morrison & Foerster LLP

(57) ABSTRACT

A thruster stack assembly and method for manufacturing the same is provided. The thruster stack assembly includes a plurality of grain elements having a common core region (e.g., a channel or passageway), where each grain element comprises a volume of electrically ignitable propellant. The thruster stack assembly further includes electrodes associated with the plurality of grain elements, the electrodes adapted for selectively igniting the plurality of grain elements. In one example, one or more of the grain elements may be ignited and combusted without igniting or damaging adjacent grain elements of the stack. The core region serves to channel combustion gases and exhaust from the thruster stack. Multiple stacks may be assembled together to form three-dimensional thruster arrays.

11 Claims, 8 Drawing Sheets

OTHER PUBLICATIONS

International Preliminary Report on Patentability mailed on Nov. 18, 2010, for PCT Application No. PCT/US2008/005793, filed on May 5, 2008, six pages.
International Search Report mailed on Jun. 30, 2009, for PCT Application No. PCT/US09/44206, filed on May 15, 2008, three pages.
International Search Report mailed on Oct. 28, 2008, for PCT Application No. PCT/US08/05793, filed on May 5, 2008, three pages.
Written Opinion mailed on Jun. 30, 2009, for PCT Application No. PCT/US09/44206, filed on May 15, 2008, six pages.
Written Opinion mailed on Oct. 28, 2008, for PCT Application No. PCT/US08/05793, filed on May 5, 2008, five pages.
U.S. Appl. No. 12/989,639, filed on May 15, 2009, by Sawka.

* cited by examiner

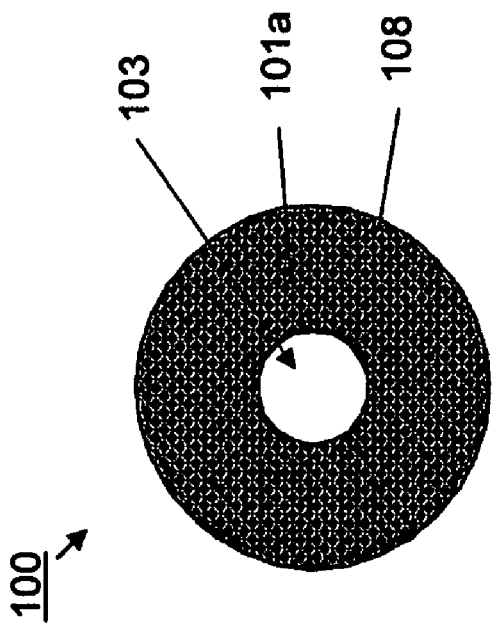
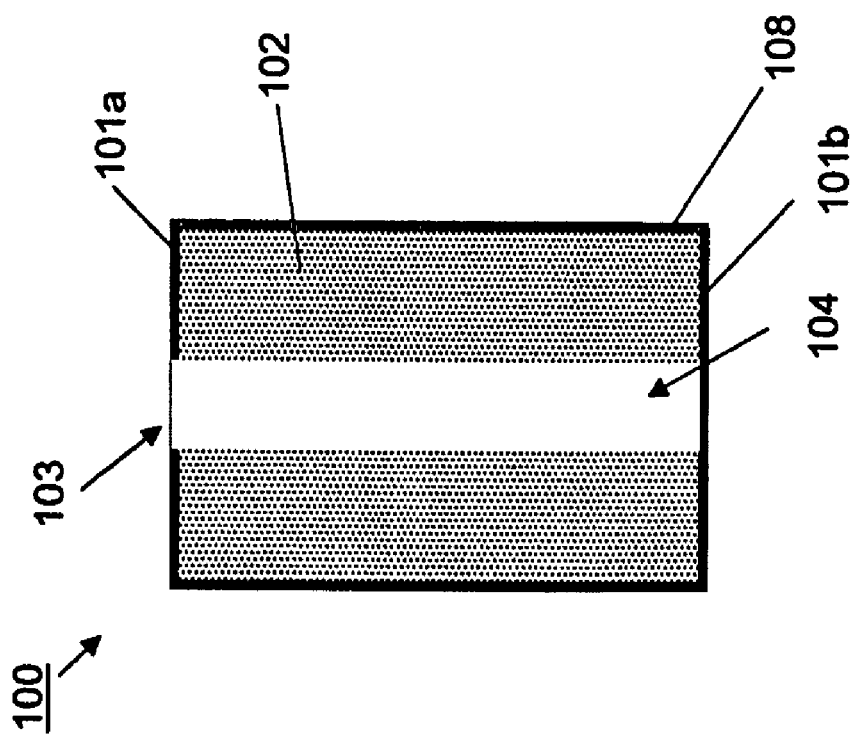

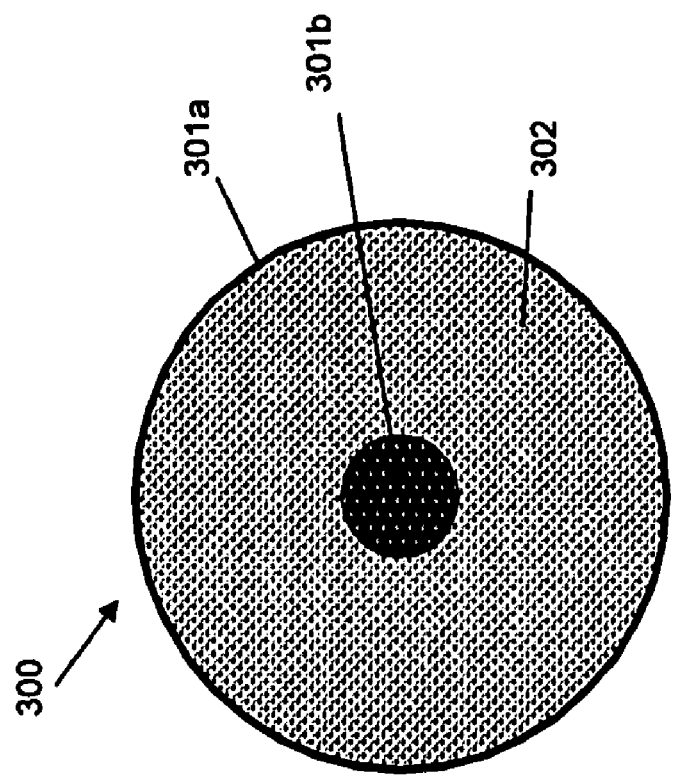
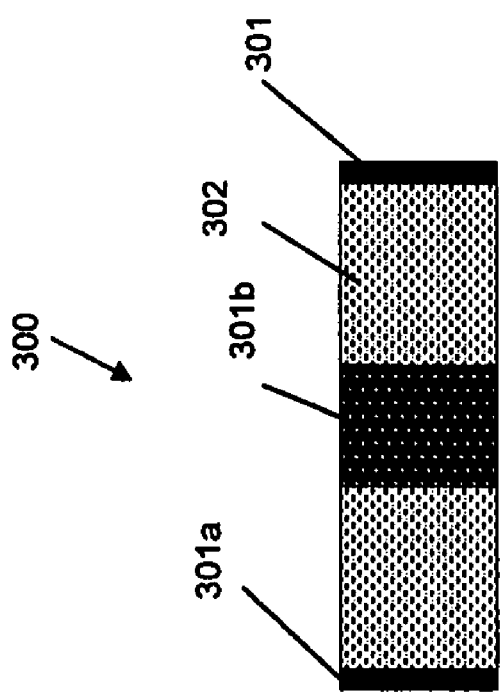
Figure 3B
Figure 3A

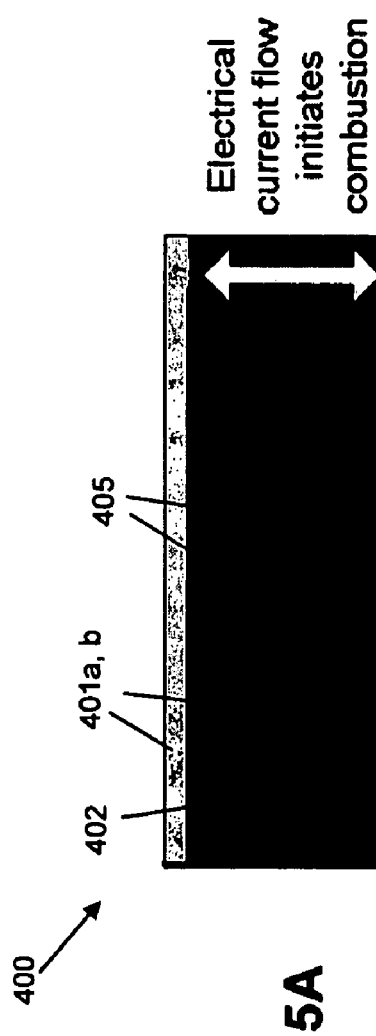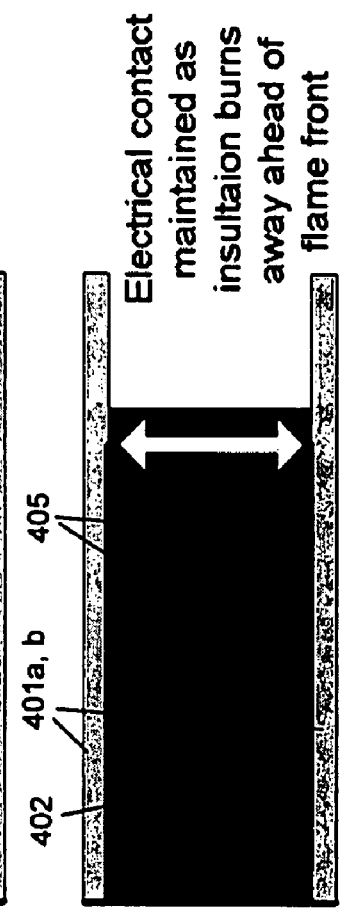
Figure 5A
Figure 5B
Figure 5C

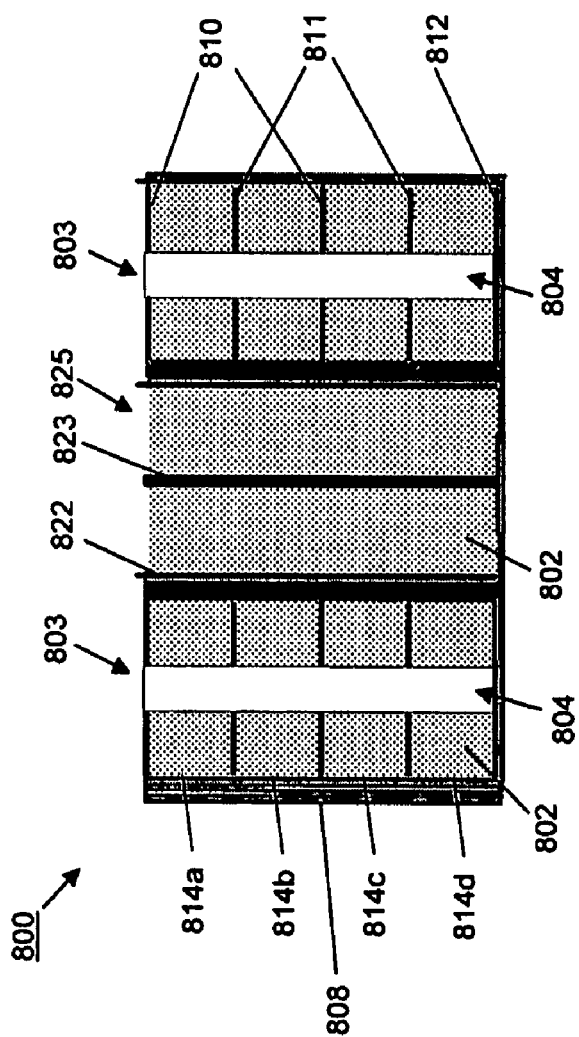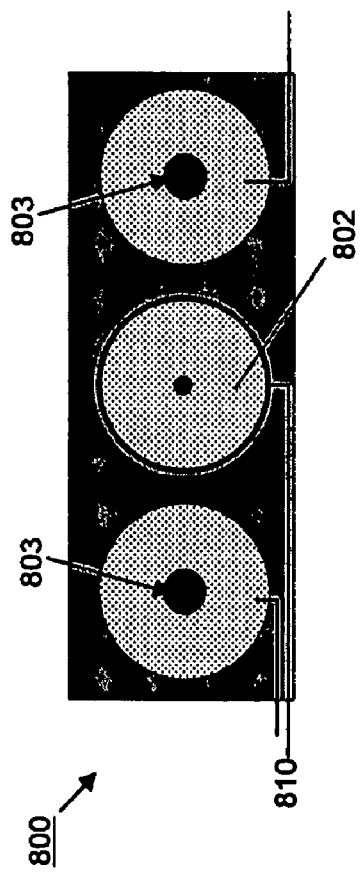
Figure 8A
Figure 8B

CONTROLLABLE DIGITAL SOLID STATE CLUSTER THRUSTERS FOR ROCKET PROPULSION AND GAS GENERATION

RELATED APPLICATION

This application is related to and claims benefit of previously filed U.S. provisional patent application Ser. No. 60/637,018, filed Dec. 17, 2004, and entitled "CONTROLLABLE DIGITAL SOLID STATE CLUSTER THRUSTERS FOR ROCKET PROPULSION AND GAS GENERATORS"; the entire content of which is hereby incorporated by reference in its entirety as if fully set forth herein.

STATEMENT REGARDING FEDERALLY SPONSORED RESEARCH OR DEVELOPMENT

Certain aspects herein were made in part during work supported by a Small Business Innovative Research contract from the United States of the Secretary of Defense; contract F04611-03-M-3-3-012: (ENHANCEMENT OF COMBUSTION SURFACE CONDUCTIVITY OF THE ELECTRICALLY CONTROLLED EXTINGUISHABLE SOLID PROPELLANT); and a Small Business Innovative Research contract from the United States Army, contract: W31P4Q04CR144 (THROTTLED PROPULSION USING AN ELECTRICALLY CONTROLLED EXTINGUISHABLE SOLID PROPELLANT DUAL-STAGE MOTOR). The government may have certain rights in the invention.

SECRECY ORDER

The present application incorporates by reference provisional patent application Ser. No. 60/637,018, currently under a secrecy order under 37 CFR 5.2. Further, the present application incorporates by reference U.S. patent application Ser. No. 10/136,786, entitled "Electrically Controlled Propellant Composition and Method", which may be or may have been under a secrecy order under 37 CFR 5.2.

BACKGROUND

1. Field

The present invention relates generally to solid state thrusters, and in one particular example to controllable digital solid state cluster thrusters for propulsion, igniters, electric matches, pyrotechnic displays, and/or gas generation that includes an electrically ignitable propellant.

2. Description of Related Art

Digital propulsion systems, and in particular, arrays of microthrusters are known. Generally, a digital propulsion system includes a two-dimensional array of individually addressable thrusters, which may be selectively fired for purposes of propulsion or gas generation. In one example, described generally in "Digital MicroPropulsion", by Lewis et al., Sensors and Actuators A, Physical, 2000, 80(2) pp 143-154, and which is incorporated by reference, an array of microthrusters are formed, where each microthruster includes a micro-resistor, thrust chamber, and rupture diaphragm. A propellant is disposed in the thrust chamber and may be ignited by energizing (and thus heating) the micro-resistor to a sufficient temperature to ignite the propellant. When the propellant is ignited the pressure in the chamber rises until the diaphragm is ruptured, resulting in the ejection of material from the chamber. The ejection of material results in a thrust imparted to the microthruster. Such microthrusters may be manufactured as dies or chips including an array of varying number and sized microthrusters. Further, the resisters may be selectively addressed to ignite and impart varying amounts of thrust.

SUMMARY

In one aspect of the present invention a thruster stack is provided. In one example, the thruster stack assembly includes a plurality of grain elements having a common core region (e.g., a channel or passageway), each grain element comprising a volume of electrically ignitable propellant. The thruster stack assembly further includes electrodes associated with the plurality of grain elements, the electrodes adapted for selectively igniting the plurality of grain elements. In one example, one or more of the grain elements may be ignited and combusted without igniting or damaging adjacent grain elements of the stack. The core region serves to channel combustion gasses and exhaust from the thruster stack.

In some examples, the thruster stack assembly may include an insulation layer and/or electrodes disposed between two adjacent grain elements. In other examples, adjacent grain elements may be disposed in direct contact with each other. The grain elements may include two coaxially aligned rings of electrically ignitable propellant, the center of the rings defining a common core region. Additionally, a thruster stack assembly may include a plurality of stacked thrusters, each thruster having a plurality of grain elements, thereby forming a three-dimensional array of addressable grain elements.

According to another aspect of the present invention, a method for manufacturing a thruster stack array is provided. In one example, the method includes layering vertically at least two dies having chambers formed therein, wherein a first chamber from a first die and a second chamber from a second die are aligned vertically, disposing two or more electrodes adjacent each cavity, affixing the at least two dies together, and disposing electrically ignitable propellant within the first and second cavities.

The method may further including removing propellant from the first and second chambers to form a common core region associated with the propellant in the first and second chambers. Each of the first and second chambers may thereby form separate grain elements that may be selectively ignited by the electrodes.

The present inventions and various aspects are better understood upon consideration of the detailed description below in conjunction with the accompanying drawings and claims.

BRIEF DESCRIPTION OF THE FIGURES

FIGS. 1A and 1B illustrate cross-sectional side and top views, respectively, of a first exemplary "core burner" structure including an electrically ignitable propellant.

FIGS. 3A and 3B illustrate cross-sectional side and top views, respectively, of a third exemplary coaxial electrode structure including an electrically ignitable propellant.

FIGS. 5A-5C illustrate an exemplary combustion process of a structure including an electrically ignitable propellant according to the example of FIG. 4.

FIGS. 8A and 8B illustrate cross-sectional side and top views, respectively, of another exemplary cluster structure allowing individual control of multiple fuel grain elements within multiple thruster/gas generators.

DETAILED DESCRIPTION

Figure 2B:
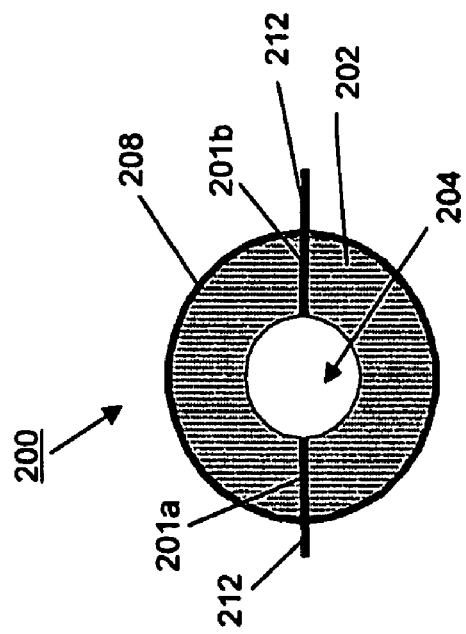
FIGS. 2A and 2B illustrate cross-sectional side and top views, respectively, of a second exemplary "core burner" structure including an electrically ignitable propellant.

The following description is presented to enable a person of ordinary skill in the art to make and use various aspects and examples of the present invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

Methods and systems for controllable digital solid state cluster thrusters and gas generators are described. Exemplary systems and methods may be used, for example, to ignite, throttle, extinguish, and re-start the combustion of high performance solid rocket propellants. Additionally, exemplary methods and systems may be used as gas generators in a variety of application. Various examples described herein may be used in rockets, missiles, spacecraft, aircraft, seacraft, and land vehicles for propulsion or as an on-demand gas generator. In one example, a solid state (i.e., no moving parts) hardware system is manufactured using either mechanical (drill, punch, cast, formed) and/or photographic/chemical etching and vapor deposition, such is used in printed circuit and/or wafer (integrated circuit) fabrication processes common in the semiconductor industry.

One exemplary propellant includes the use of solid/solid-solution rocket propellants that are controlled by the application of electrical power, e.g., where ignition and/or combustion of the propellant is sustained by supplying electrical power (referred to herein generally as "electrically ignitable propellant"). Such a propellant is described in U.S. patent application Ser. No. 10/136,786, entitled "Electrically Controlled Propellant Composition and Method", the entire content of which is hereby incorporated by reference as if fully set forth herein. The use of an electrically ignitable propellant obviates the need for igniters (e.g., spark or other thermal igniters such as resistor elements or the like) to initiate propellant combustion. Accordingly, in examples described herein, combustion of a specific volume of propellant (referred to herein as a "grain" or "grain element" of propellant) is initiated and/or controlled by electrical power between electrodes and through the propellant.

Exemplary thrusters and gas generators described herein may be desirable because they are controllable and have no moving parts. Grain elements can also be stacked into three-dimensional arrays, without the need to separate or channel hot combustion gases away from adjacent unused propellant grains. Scaling of manufacturing methods spans from those of the semiconductor industry for microchips, such as photo etching and chemical vapor deposition, upwards to drill, stamped, or molded dies layered together for larger devices. These manufacturing methods may allow mass production of these devices at relatively low compared to conventional thruster devices.

FIGS. 1A and 1B illustrate cross-sectional side and top views, respectively, of a first exemplary "core burner" structure 100 including an electrically ignitable propellant 102. In this example, structure 100 includes a single grain element or volume of electrically ignitable propellant 102 to be ignited and controlled by electrodes 101$a$ and 101$b$. In operation, washer-shaped electrodes 101$a$ and 101$b$ conduct current through the electrically ignitable propellant 102 causing electrically controlled combustion. The application of voltage to electrodes 101$a$ and 101$b$ may be controlled to combust a portion or all of the propellant 102. Further, structure 100 is generally configured such that combustion initiates from the middle or core region 104 and proceeds radially outward. During combustion, exhaust gases and heat are channeled via core region 104 to exit through an aperture or port 103.

In this example, washer shaped electrodes 101$a$ and 101$b$ are disposed axially on opposite ends of a housing 108 containing propellant 102. Housing 108 may include a cylindrical insulating case for containing propellant 102 and is closed by electrodes 101$a$ and 101$b$ disposed on each end thereof. At least one of the electrodes 101$a$ and 101$b$ includes an aperture or port 103 at an end of core region 104 which allows for the escape of heat and gas from combustion of propellant 102.

Propellant 102 is disposed within housing 108 in an annulus cross-sectional shape, thereby defining central core region 104 disposed along the axis of structure 100. Propellant 102 may be disposed with housing 108 in any manner, for example, cast, poured, vacuum poured or the like into housing 108 or other suitable packaging. Central core region 104 may be formed within propellant 102 by drilling or other post processing (e.g., etching, punching, or other material removal processes). Further, in this example, central core region 104 is aligned at least partially with an aperture in washer electrode 101$a$ (or otherwise formed in electrodes 101$a$, 101$b$, or housing 108) to assist in channeling gas and heat through port 103 and out of structure 100.

Figure 2A:
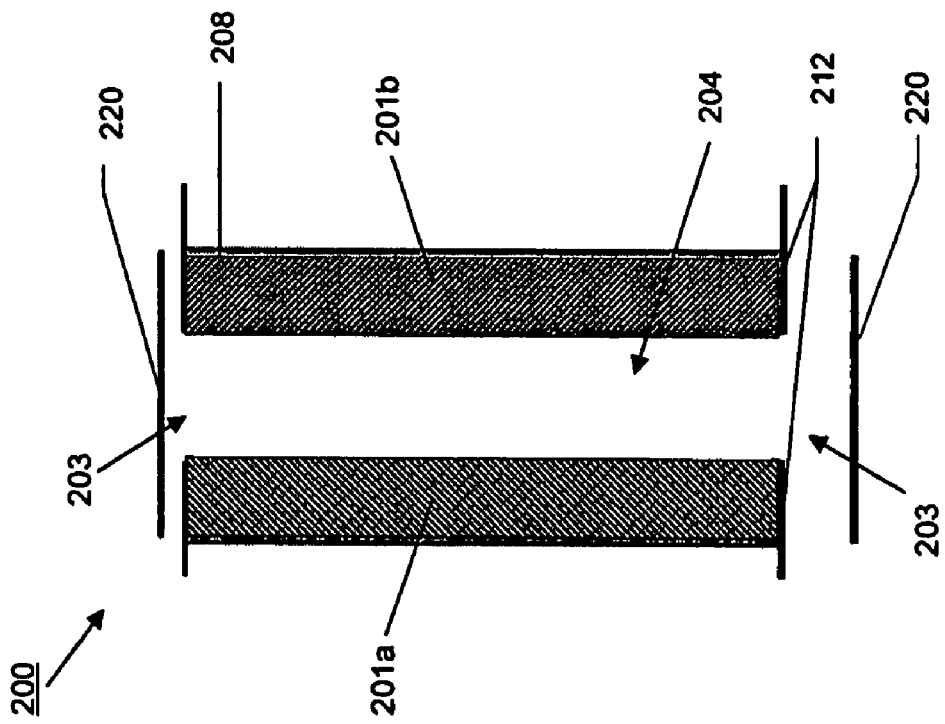

FIGS. 2A and 2B illustrate cross-sectional side and top views, respectively, of a second exemplary "core burner" structure 200 including an electrically ignitable propellant 202. In this example, which is similar to structure 100, structure 200 includes flat, ribbon shaped electrodes 201$a$ and 201$b$ positioned lengthwise along structure 200 (e.g., along the axis and extending radially from the center core region 204). In operation, with sufficient potential applied across electrodes 201$a$ and 201$b$, electrical current will pass between electrodes 201$a$ and 201$b$ causing electrically controlled combustion of propellant 204. Combustion will begin along the central core region 204 similar to that described above with reference to structure 100 of FIGS. 1A and 1B.

FIG. 2A further illustrates electrical connectors 212 which may be disposed on either or both sides of structure 200. Electrical connectors 212 may include pins or leads for connecting electrodes 201$a$ and 201$b$ to a power source or die (neither of which are shown). Further shown are forward and aft closures or nozzles 220, positioned adjacent exhaust ports 203, and which may be included on either or both axial ends of structure 200 and core region 204. Nozzles 220 may be used to control combustion or gas generation of structure 200 as will be understood by those of ordinary skill in the art.

Electrodes 201$a$ and 201$b$ are shown positioned 180 degrees apart from each other. In other examples, however, electrodes 201$a$ and 201$b$ may be positioned differently; further, multiple sets of electrodes may be disposed within propellant 202, thereby creating multiple grain elements.

FIGS. 3A and 3B illustrate cross-sectional side and top views, respectively, of an exemplary coaxial electrode structure 300 including an electrically ignitable propellant 302. In this example, electrodes 301*a* and 301*b* are disposed coaxially with electrically ignitable propellant 302 disposed therebetween. In particular, electrode 301*a* includes an outer ring shaped electrode and electrode 301*b* includes a rod or smaller ring shaped electrode disposed within electrode 301*a*.

As previously described, propellant 302 is ignited with suitable potential supplied across electrodes 301*a* and 301*b*. In this example, an exhaust port is positioned generally at the axial top and/or bottom axial face of structure 300. In one example, a housing (not shown) may be included to cover the bottom axial surface of structure 300 such that as propellant 302 is ignited and combusted from the top axial surface and proceeds downward. Burn away insulation may be used on one or both electrodes 301*a* and 301*b*. Multiple structures may be grouped or clustered together using a common electrical ground to provide individual combustion control with fewer wires. Such a cluster may be potted in a suitable matrix forming a unified solid-state device.

FIGS. 4 and 5A-5C illustrate another exemplary electrode structure 400 including an electrically ignitable propellant 402. In this example, electrodes 401*a* and 401*b* include flexible or ridged flat plates that are manufactures as a layered structure and then rolled into a cylindrical structure (as indicated generally in FIG. 4) or stacked flat into a multi-layer structure. The exemplary method and structure may preserve electrode spacing and enable larger amounts of propellant to be burned efficiently during use. For example, coaxial electrode structures such as illustrated in FIGS. 3A and 3B, include core and outer electrodes that have different surface areas. The different surface areas of the electrodes may result in radial electrical current density variations that may cause combustion inefficiency during operation. The use of flat plate electrodes 401*a* and 401*b* (which are spiraled into a final structure 400 shown in FIG. 4) may allow more uniform electrical current density therebetween and more efficient combustion of the propellant 402.

Figure 4:
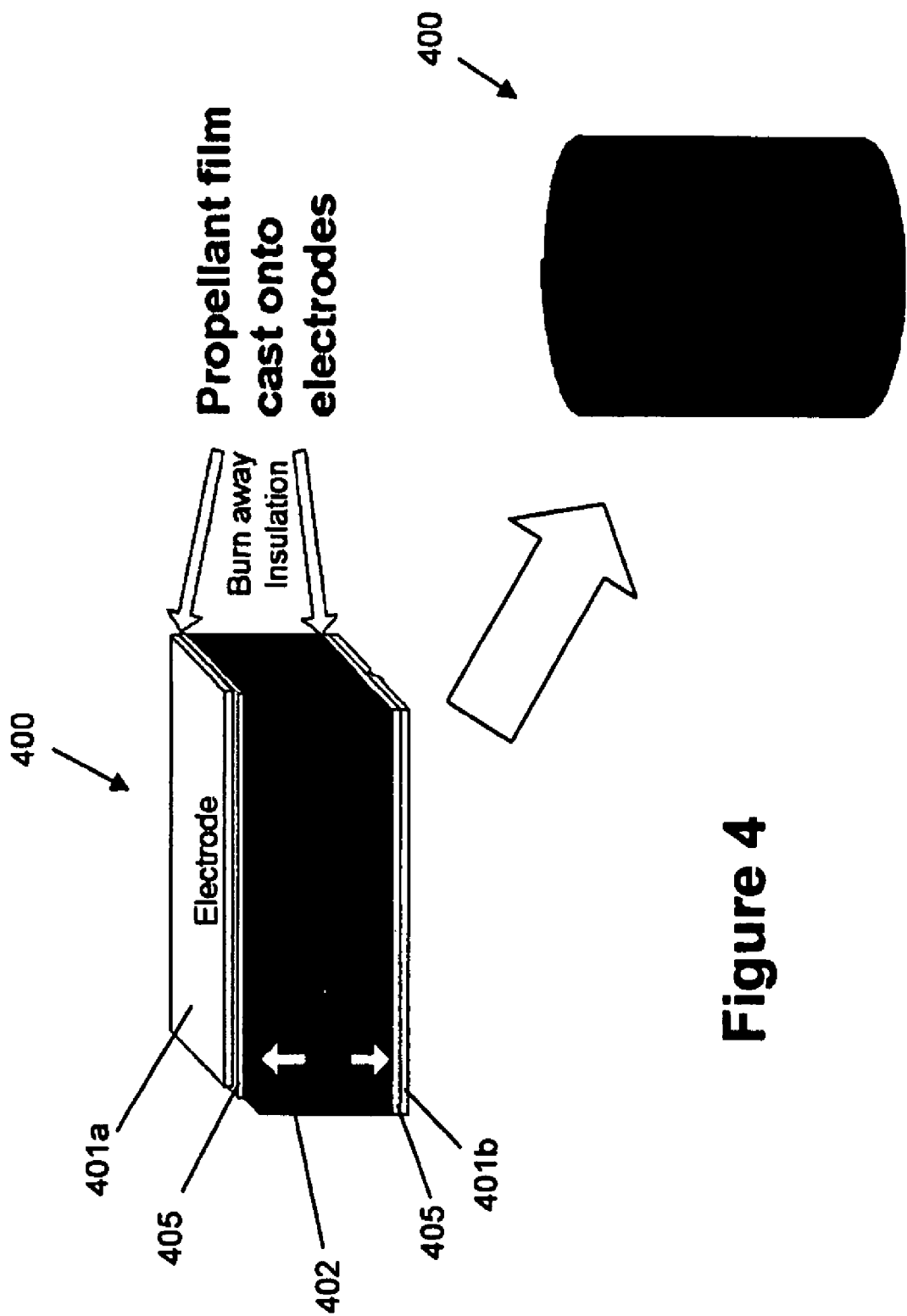
FIG. 4 illustrates an exemplary thruster structure including an electrically ignitable propellant according to another example.

In one example, structure 400 includes electrodes 401*a* and 401*b*, an insulation layers 405 disposed on electrodes 401*a* and 401*b*, and an electrically ignitable propellant 402 therebetween. In one example, propellant 402 is disposed, e.g., cast or otherwise layered onto insulation layer 401 and/or electrodes 401*a* and 401*b*, at a thickness of approximately 0.12 inches (of course, other propellant thicknesses are possible). The separation between electrodes 401*a* and 401*b* may be varied for efficient combustion of propellant, such as HIPEP propellant (High Power Electric Propulsion propellant). HIPEP propellant is described, for example, in AFRL-PR-ED-TR-2004-0076, "High Performance Electrically Controlled Solution Solid Propellant," Arthur Katzakian and Charles Grix, Final Report, the entire content of which is incorporated by reference herein. In one example, electrically ignitable propellant, such as HIPEP propellants, are generally flexible when cured. Further, the use of flexible foils or thin metal layers for electrodes 401*a* and 401*b* allows for rolling thick films or layers of the electrodes 401*a* and 401*b* and propellant 402 into spiral shaped structures as shown in FIG. 4.

Additionally, the material of electrodes 401*a* and 401*b*, e.g., aluminum or other suitable material, may be consumed during combustion of propellant 402, thereby increasing the specific impulse of the thruster or other device while still allowing multiple extinguishments. In one example, however, the material of the electrodes 401*a* and 401*b* may cause propellant 402 to self sustain combustion (i.e., the propellant will not extinguish when power to electrodes 401*a* and 401*b* is ceased). Accordingly, the electrode metal, thickness, volume, etc., may be configured so as to be consumed during combustion, but not lead to self sustaining combustion of propellant 402. In other examples, electrodes 401*a* and 401*b* may include stainless steel or the like so as to not be consumed by the combustion. Additionally, insulation layer 405, which may include Teflon or Phenolic coatings, may also be combusted with propellant 402.

FIGS. 5A-5C illustrate an exemplary combustion process of a portion of propellant 402 of structure 400. As seen in FIG. 5A, insulation layers 405 do not extend to the edge of the layered structure 400 such that a portion of propellant 402 contacts opposing electrodes 401*a* and 401*b*. Electrodes 401*a* and 401*b* may be energized to initiate combustion in this region of structure 400. As the electrodes 401*a* and 401*b* continue to be energized, as shown in FIG. 5B, propellant 402 and insulation layers 405 combust (heat and gas exiting to the right). The insulation layer 405 burns away in front of the flame front, thereby sustaining a contact between electrodes 401*a* and 401*b* and propellant 402. The power supplied to electrodes 401*a* and 401*b* may be stopped, as shown in FIG. 5C, and combustion ceased. The insulation layer 405 burns away in front of the flame front or combustion of propellant 402 such that when combustion is ceased electrodes 401*a* and 401*b* are still in contact with propellant 402 and may be reinitiated by providing power to electrodes 401*a* and 401*b*.

According to another aspect described herein, multiple structures for igniting electrically ignitable propellant (e.g., structures 100, 200, 300 or 400), may be combined into arrays of individually addressable grain elements. For example, multiple grain elements or structures similar to those illustrated by structures 100, 200, 300, or 400 may be combined or stacked into a variety of thruster arrays suitable for various propulsion or gas generation devices.

Figure 6:
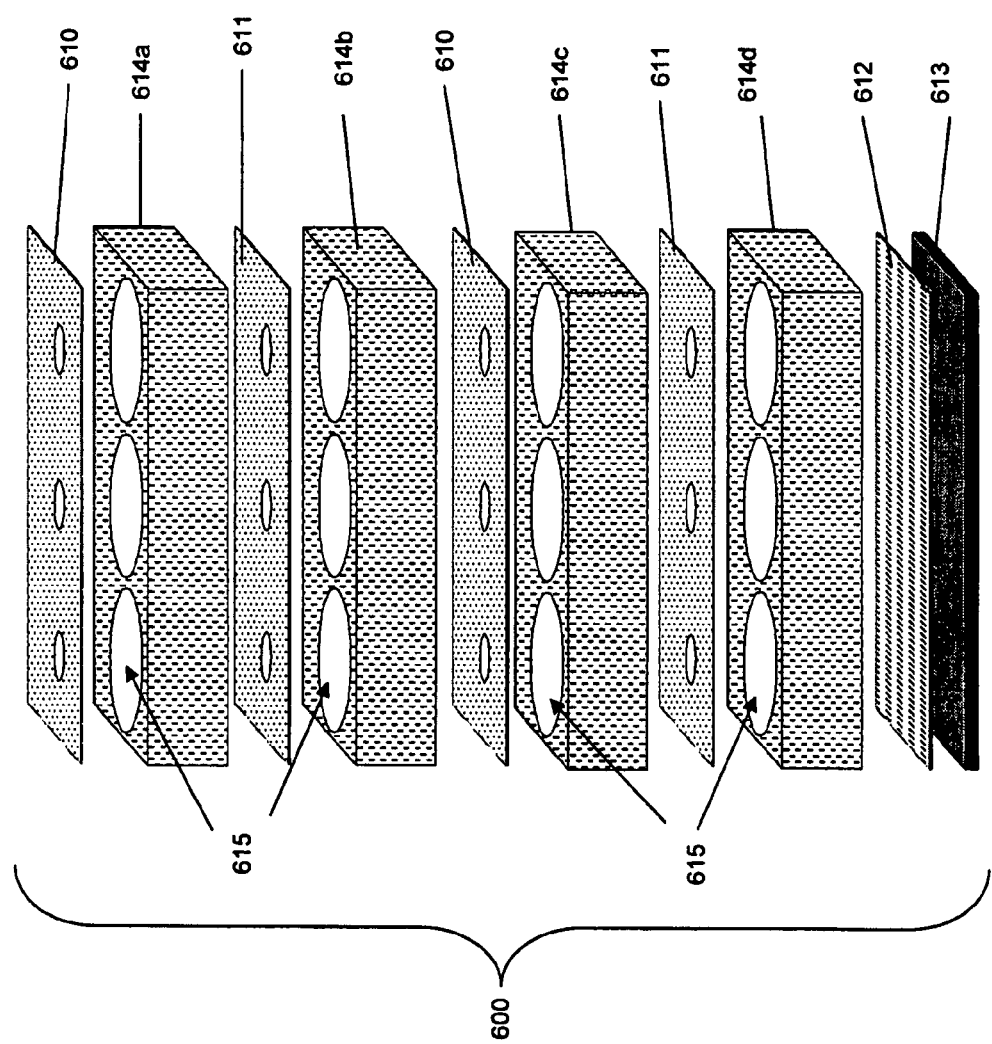
FIG. 6 illustrates an exemplary configuration and method for forming a thruster stack array of grain elements.

FIG. 6 illustrates an exemplary configuration and method for forming a thruster stack array 600, which may be used for propulsion and/or gas generation. The exemplary method results in a thruster stack assembly 600 that allows for individual control of four fuel grain elements within each of three vertically aligned thrusters as shown in cross-sectional and top views in FIGS. 7A and 7B, which are referenced in conjunction with FIG. 6. As will be appreciated by those of ordinary skill in the art, the number of thrusters and vertically aligned grain elements are illustrative only, and any number of thrusters and/or grain elements are possible. Further, various examples of grain elements described herein, e.g., with reference to FIGS. 1-4, may be combined into a thruster stack array.

In this example, common electrode dies 610 and individual electrode dies 611 are disposed (e.g., stacked or layered vertically) with insulating propellant chamber dies 614*a*-614*d*. Chamber dies 614*a*-614*d* include chambers 615, which will have propellant disposed therein. Chamber dies 614*a*-614*d*, and in particular chambers 615, are aligned vertically. Electrode dies 610 and 611 are also aligned vertically with each other and chamber dies 614*a*-614*d*. Additionally, a forward electrode 612 and an aft nozzle or gas exhaust connection 613 may be included with the assembly. The stack of electrode dies 610 and 611 and chamber dies 614*a*-614*d* are laminated or otherwise affixed or housed together as a single assembly.

Once the stack is laminated, suitable propellant is disposed within chamber dies 614*a*-614*d*, and in particular, chambers 615. The propellant may be disposed within chambers 615 by any suitable method. For example, propellant may be poured, vacuum poured, cast, or otherwise introduced into chambers 615 of chamber dies 614*a*-614*d*. As shown, the propellant chamber dies 614*a*-614*d* have individual openings for containing propellant having a larger radial surface than apertures in electrode dies 601*a* and 601*b* such that when filled with propellant electrode dies 601a and 601b are in contact with propellant therein (such that propellant 602 may be ignited).

The exemplary methods and structures described allow for multiple thruster units to be manufactured simultaneously, reducing costs while providing redundancy. The examples are generally scalable and allow several different size thrusters to be included in a single assembly. The grain elements may be in direct contact with one another or separated by conductive electrodes or insulating layers as shown and described. Further, the electrodes may include conductive materials such as copper, aluminum, stainless steel, zirconium, gold, and the like. Insulator materials for the dies, casing, or to separate grains may include rubber, phenolic, Teflon®, ceramic, and the like. The electrode geometries may be configured to allow specific volumes or surfaces of propellant to be ignited individually and/or in combination to achieve desired thrust/gas generation control. Electrode geometry and/or conductive surface coatings can control propellant combustion either proceeding inward from surfaces or to instantaneously ignite specific volumes. Electrode surfaces may be varied from smooth to porous mesh changing the surface area in contact with the propellant. Once the hardware assemblage/stack is formed, the propellant is added by casting with or without vacuum depending on scale. Additionally, mandrels may be used to control propellant casting as is known in the art.

Additional manufacturing systems and methods related to those described herein are described in Lewis et al., "Digital MicroPropulsion", Sensors and Actuators A. Physical, 2000, 80(2) pp 143-154, which is hereby incorporated by reference as if fully set forth herein.

Various additional features may be included, such as electrical pins, connectors, housings, electrode structures, and the like. It will be appreciated that one may use a chamber die having a two-dimensional array of propellant chambers and stacking or layering grain elements as described herein to form a three-dimensional thruster array. Additionally, various other processing techniques may be used and the processing techniques described may be carried out in other orders or in parallel.

Figure 7A:
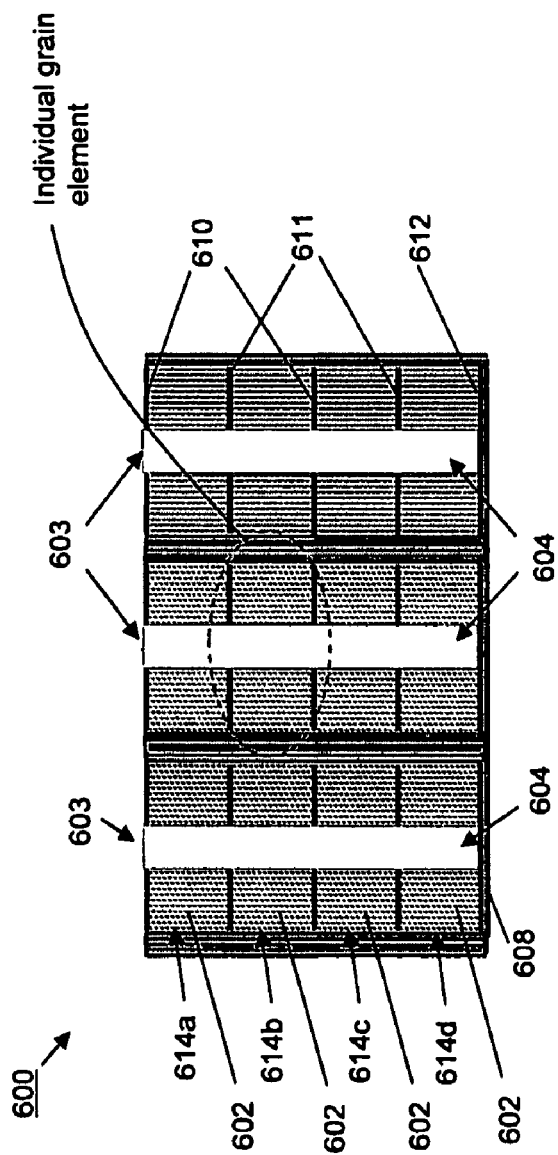
FIGS. 7A and 7B illustrate cross-sectional side and top views, respectively, of an exemplary cluster structure allowing individual control of multiple fuel grain elements within multiple thruster/gas generators.
Figure 7B:
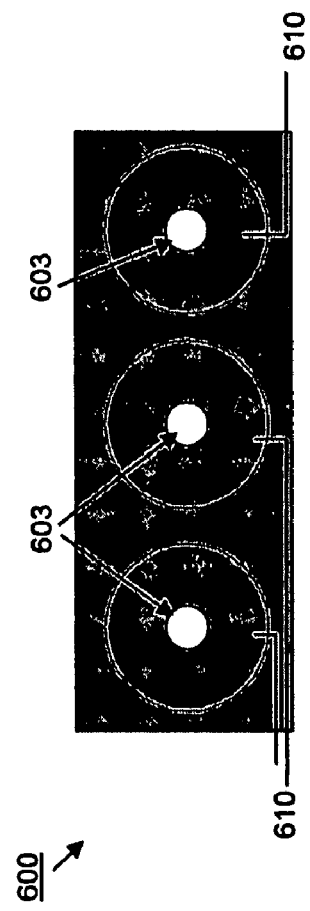

FIGS. 7A and 7B illustrate cross-sectional side and top views, respectively, of exemplary thruster stack array 600 after the addition of propellant 602 and common core regions 604 have been formed. The common core regions 604 are used to channel combustion gases and heat from each of the vertically aligned grain elements, one of which is identified in FIG. 7A (defined generally by chambers 615 of die layers 614a-614d). Thus, in this example, thruster stack array 600 includes three vertical stacks of grain elements having a common core region 604 and a common exhaust port 603. The common core region 604 and exhaust port 603 may be formed after the propellant is disposed in the structure by drilling, etching, milled, laser milled, or other suitable material removal processes. The stack may further include appropriate pin-outs for electrically connecting the electrodes dies 610, 611, and 612, and further include a housing 618.

Thus, thruster stack array 600 includes 12 individual grain elements (defined generally by propellant 602 within each chamber 615 of chamber dies 614a-614d), and which may be selectively ignited by appropriately addressing the connections between electrode dies 610, 611, and 612. The combustion heat and gasses from combusting any one grain element is channeled through center core regions 604 and out exhaust ports 603 (without igniting or damaging neighboring grain elements).

In some examples, the propellant grain elements may be single cast and/or cast together and stacked, and combined into arrays using a variety of laminating methods with adhesives, epoxies, diffusion bonding, or the like. In one example, the stacked grain elements may be in direct contact with one another, but still ignited individually and/or in combination without igniting adjacent grains. In other examples, the grain elements may be separated by the electrodes or insulation layers.

FIGS. 8A and 8B illustrate cross-sectional side and top views, respectively, of another exemplary thruster stack array 800 allowing individual control of a plurality of grain elements. Thruster stack array 800 is similar to that of thruster stack array 600 illustrated in FIGS. 6, 7A, and 7B, but utilizes two core-burner thruster stack structures as well as a coaxial thruster structure (similar to that shown and described with respect to FIGS. 2A and 2B). In other examples, a structure could further include a spiral coaxial thruster similar to that shown in FIGS. 3A and 3B.

The coaxial thruster includes a coaxial rod electrode 823 and a cylindrical electrode 822 encasing propellant 802. Electrodes 822 and/or 823 may be coated with burn away insulating coatings to promote combustion along the open end 825 (similar to that described with respect to FIGS. 5A-5C). The central rod electrode 823 may also be formed into higher surface area geometries having cross-sectional shapes such as crosses or star patterns.

In one example, which may be manufactured similar to that of described for FIG. 6, the coaxial assemblage uses a central electrode 823 and segmented cylindrical/ring outer electrodes disposed with insulator dies 814a-814d between electrodes 810, 811, and 812 and propellant grains. Insulating dies 814a-814d may further provide an outer case for electrical contact feeds to an electrical control unit (not shown). Other combinations of multiple core burning grains and coaxial grains as illustrated in FIGS. 1-7B are possible and contemplated.

The above detailed description is provided to illustrate exemplary embodiments and is not intended to be limiting. It will be apparent to those skilled in the art that numerous modifications and variations within the scope of the present invention are possible. For example, various examples described herein may be used alone or in combination with other systems and methods, and may be modified for varying applications and design considerations. Accordingly, the present invention is defined by the appended claims and should not be limited by the description herein.

The invention claimed is:

1. A thruster assembly, comprising:
   a volume of electrically ignitable propellant, wherein the electrically ignitable propellant is ignitable in response to the application of electrical power there through;
   a pair of electrodes operable to ignite the propellant via application of electrical power there through; and
   an insulation layer disposed on at least one of the electrodes and operable to combust with the propellant.

2. The assembly of claim 1, wherein the volume of electrically ignitable propellant includes a cylindrical ring of propellant defining a core region, the core region operable to channel exhaust gasses from the assembly during combustion.

3. The assembly of claim 1, wherein the volume of electrically ignitable propellant includes a cylindrical ring of propellant, and the pair of electrodes are disposed on axial ends of the cylindrical ring of propellant.

4. The assembly of claim 1, wherein the volume of electrically ignitable propellant includes a cylindrical ring of propellant, and the pair of electrodes are disposed axially within the propellant.

5. The assembly of claim 1, wherein the pair of electrodes includes coaxially disposed electrodes.

6. The assembly of claim 1, wherein the pair of electrodes are disposed on opposing surfaces of the propellant and spiraled in a cylindrical structure.

7. The assembly of claim 1, further including an insulating housing supporting at least a portion of the propellant and the pair of electrodes.

8. The assembly of claim 1, wherein the electrically ignitable propellant is operable to be ignited by the application of electrical power through the electrically ignitable propellant.

9. The assembly of claim 1, wherein the electrically ignitable propellant includes a solid electrically ignitable propellant.

10. The assembly of claim 1, wherein the insulation layer is operable to completely combust with the propellant.

11. The assembly of claim 1, wherein the insulation layer is operable to combust with the propellant and expose at least a portion of the electrode.

* * * * *